(12) United States Patent
Matsui

(10) Patent No.: US 11,285,622 B2
(45) Date of Patent: Mar. 29, 2022

(54) WRIST STRUCTURE OF ROBOT, AND ROBOT

(71) Applicant: Fanuc Corporation, Yamanashi (JP)

(72) Inventor: Hideo Matsui, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 25 days.

(21) Appl. No.: 16/747,196

(22) Filed: Jan. 20, 2020

(65) Prior Publication Data
US 2020/0246981 A1    Aug. 6, 2020

(30) Foreign Application Priority Data
Jan. 31, 2019    (JP) .............................. JP2019-016090

(51) Int. Cl.
*B25J 17/02* (2006.01)
*B25J 19/00* (2006.01)

(52) U.S. Cl.
CPC ........... *B25J 17/02* (2013.01); *B25J 19/0058* (2013.01); *B25J 19/0062* (2013.01); *B25J 19/0075* (2013.01)

(58) Field of Classification Search
CPC .... B25J 17/02; B25J 19/0058; B25J 19/0062; B25J 19/0075
USPC ......................................... 74/490.06; 901/29
See application file for complete search history.

(56) References Cited

U.S. PATENT DOCUMENTS

| | | | |
|---|---|---|---|
| 4,708,580 A * | 11/1987 | Akeel | B25J 19/0029 277/412 |
| 10,011,026 B2 * | 7/2018 | Okada | B25J 19/0075 |
| 10,603,801 B2 * | 3/2020 | Zhu | F16J 15/3268 |
| 2014/0060236 A1 * | 3/2014 | Watanabe | B25J 19/0075 74/490.06 |
| 2017/0266820 A1 * | 9/2017 | Zhu | F16J 15/3268 |

FOREIGN PATENT DOCUMENTS

| | | | | |
|---|---|---|---|---|
| CN | 1020478114 | * | 5/2012 | |
| CN | 202480101 | * | 10/2012 | |
| EP | 0744252 A1 | * | 11/1996 | ......... B25J 19/0075 |
| JP | 05067438 U | | 9/1993 | |
| JP | 2011-20219 A | | 2/2011 | |
| JP | 2011 245586 | * | 12/2011 | |
| JP | 2011245586 A | | 12/2011 | |
| JP | 2013189052 A | | 9/2013 | |
| JP | 2017227243 A | | 12/2017 | |

* cited by examiner

*Primary Examiner* — William C Joyce
(74) *Attorney, Agent, or Firm* — RatnerPrestia

(57) ABSTRACT

A wrist structure of a robot capable of protecting an oil seal of a wrist structure from a high-pressure jet for cleaning or from external foreign matter or the like. A wrist structure of a robot includes a wrist body, a holder attached to the wrist body, a wrist flange rotatably supported by the holder, an oil storage provided between the wrist body and the holder, an oil seal disposed between the holder and the wrist flange and configured to prevent oil from leaking from the oil storage, and a cover that is formed integrally with the holder and that covers the oil seal from the outside between the holder and the wrist flange.

10 Claims, 8 Drawing Sheets

WRIST STRUCTURE OF ROBOT, AND ROBOT

CROSS-REFERENCE TO RELATED APPLICATIONS

This application is a new U.S. Patent Application that claims benefit of Japanese Patent Application No. 2019-016090, dated Jan. 31, 2019, the disclosure of this application is being incorporated herein by reference in its entirety for all purposes.

BACKGROUND OF THE INVENTION

1. Field of the Invention

The present invention relates to a wrist structure of a robot and a robot including the wrist structure.

2. Description of the Related Art

A wrist structure of a robot is known that includes an oil seal to prevent oil leakage (e.g., JP 2011-20219 A).

The oil seal of the wrist structure is required to be protected from a high-pressure jet for cleaning or from external foreign matter or the like.

SUMMARY OF THE INVENTION

In an aspect of the present disclosure, a wrist structure of a robot includes a wrist body, a holder attached to the wrist body, a wrist flange rotatably supported by the holder, an oil storage provided between the wrist body and the holder, an oil seal disposed between the holder and the wrist flange to prevent oil leakage from the oil storage, and a cover formed integrally with the holder and configured to cover the oil seal from the outside between the holder and the wrist flange.

According to the present disclosure, when the wrist structure is cleaned with a high-pressure jet, the high-pressure jet can be prevented from impinging on the oil seal directly, thereby preventing the oil seal from being displaced by the high-pressure jet, or preventing the high-pressure jet from entering the wrist structure. It is also possible to prevent external foreign matter (dust, cutting fluid, etc.) from adhering to the oil seal.

DETAILED DESCRIPTION

Figure 1:
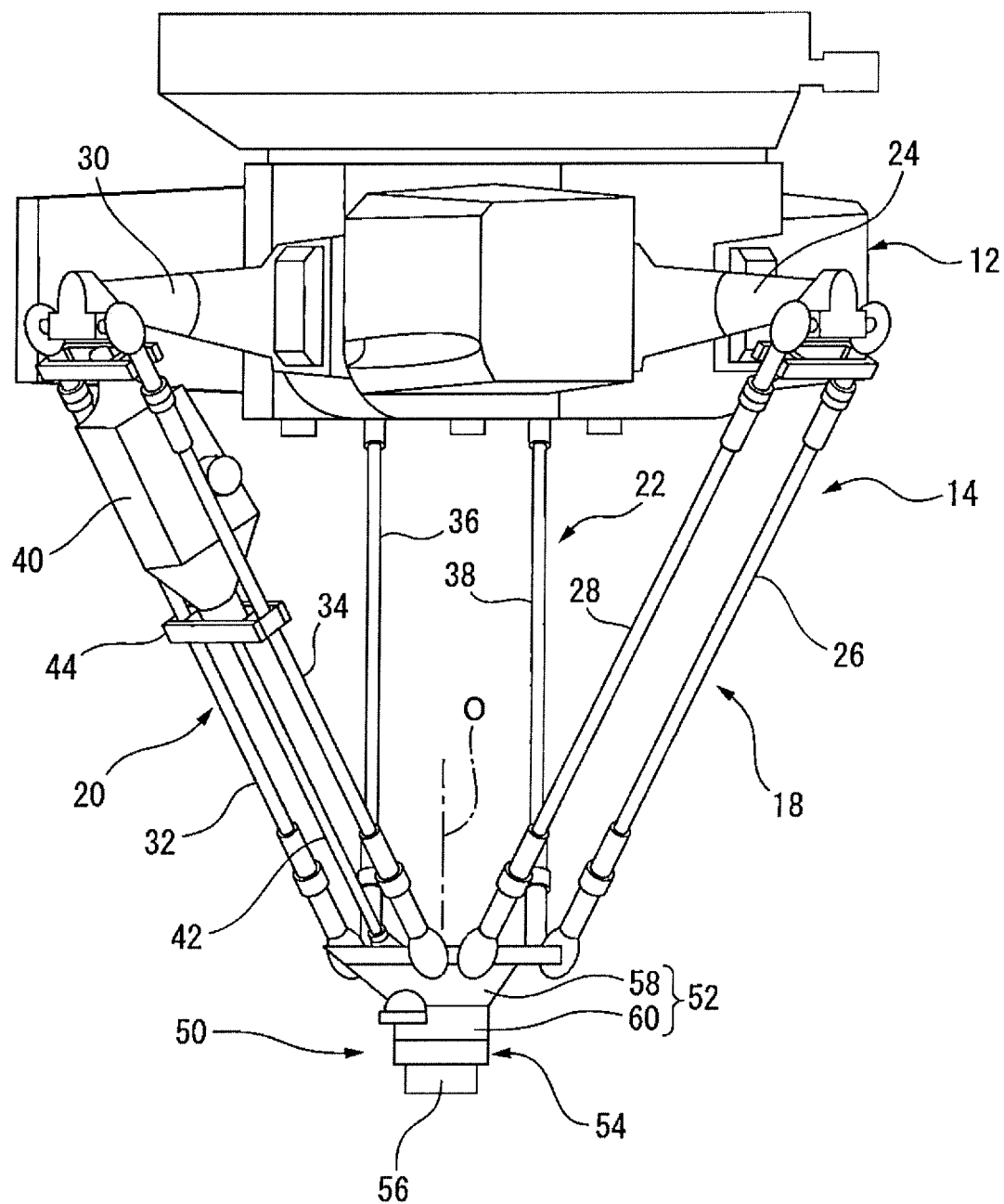
FIG. 1 is a view of a robot according to an embodiment.

Embodiments of the present disclosure will now be described in detail with reference to the drawings. Note that, in the various embodiments described below, similar elements are denoted by the same reference numerals, and redundant descriptions thereof will be omitted. First, a robot 10 according to an embodiment will be described with reference to FIG. 1. The robot 10 is a parallel-link robot. Specifically, the robot 10 includes a base 12, a robot arm 14, and a wrist structure 50.

The robot arm 14 includes a first link mechanism 18, a second link mechanism 20, and a third link mechanism 22. The first link mechanism 18 includes a first drive link 24 and a pair of passive links 26 and 28. The first drive link 24 is rotatably coupled to the base 12. Each of the pair of passive links 26 and 28 is rotatably coupled, at its proximal end, to a distal end of the first drive link 24, and rotatably coupled, at its distal end, to the wrist structure 50.

The second link mechanism 20 includes the same configuration as the first link mechanism 18. Specifically, the second link mechanism 20 includes a second drive link 30 rotatably coupled to the base 12 and a pair of passive links 32 and 34. Each of the pair of passive links 32 and 34 is rotatably coupled, at its proximal end, to a distal end of the second drive link 30, and rotatably coupled, at its distal end, to the wrist structure 50.

The third link mechanism 22 has the same configuration as the first link mechanism 18. Specifically, the third link mechanism 22 includes a third drive link (not illustrated) rotatably coupled to the base 12 and a pair of passive links 36 and 38. Each of the pair of passive links 36 and 38 is rotatably coupled, at its proximal end, to a distal end of the third drive link, and is rotatably coupled, at its distal end, to the wrist structure 50.

The wrist structure 50 is movably supported by the base 12 via the first link mechanism 18, the second link mechanism 20, and the third link mechanism 22. The robot arm 14 further includes a first link driver (not illustrated) configured to rotate the first drive link 24, a second link driver (not illustrated) configured to rotate the second drive link 30, and a third link driver (not illustrated) configured to rotate the third drive link. By the first link driver, the second link driver, and the third link driver rotating the first drive link 24, the second drive link 30, and the third drive link, respectively, the wrist structure 50 can be moved in the three axis-directions of the orthogonal coordinate system.

The robot arm 14 further includes an auxiliary driver 40 and an auxiliary shaft 42. In the present embodiment, the auxiliary driver 40 is disposed between the passive links 32 and 34. The auxiliary driver 40 is coupled, at its proximal end, to the second drive link 30, and is slidably coupled, at its distal end, to the passive links 32 and 34 via a fixture 44.

The auxiliary shaft 42 is coupled, at its proximal end, to the auxiliary driver 40, and is rotatably coupled, at its distal end, to the wrist structure 50. The auxiliary shaft 42 extends between the auxiliary driver 40 and the wrist structure 50 so as to be parallel to the passive links 32 and 34. The auxiliary driver 40 advances and retracts the auxiliary shaft 42 along the extending direction of the passive links 32 and 34. The auxiliary driver 40 changes the orientation of the wrist structure 50 by advancing and retracting the auxiliary shaft 42.

Figure 2:
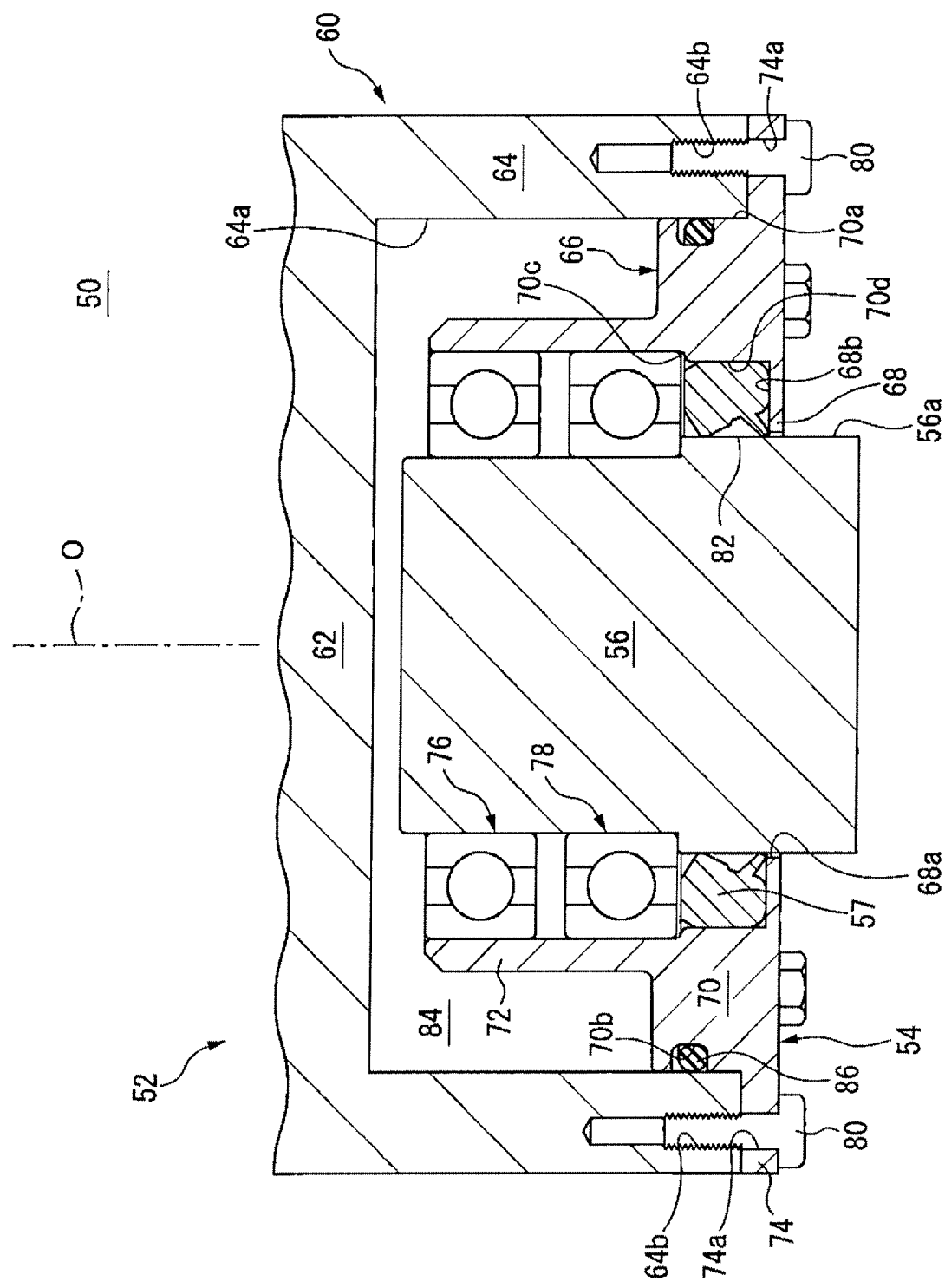
FIG. 2 is an enlarged cross-sectional view of a main portion of a wrist structure illustrated in FIG. 1.

Next, the wrist structure 50 will be described with reference to FIGS. 1 and 2. Note that, in the following description, an axial direction indicates a direction along an axis O, a radial direction indicates a radial direction of a circle centered about the axis O, and a circumferential direction indicates a circumferential direction of the circle. Further, for convenience, the downward (lower) direction in FIG. 2 is referred to as downward (lower) direction.

The wrist structure 50 is a substantially circular member having a central axis O. Specifically, the wrist structure 50 includes a wrist body 52, a holder member 54, a wrist flange 56, and an oil seal 57 (FIG. 2). The wrist body 52 includes a base 58 and a holder supporting portion 60. The base 58 has a substantially frusto-conical outer shape, and the distal ends of the passive links 26 and 28, the passive links 32 and 34, and the passive links 36 and 38 are rotatably supported at the upper end of the base 58.

The holder supporting portion 60 is fixedly provided at the lower end of the base 58. As illustrated in FIG. 2, the holder supporting portion 60 includes a base portion 62 fixed to the lower end of the base 58, and a side wall 64 extending axially downward from the base portion 62. The base portion 62 is a circular member centered about the axis O, and the side wall 64 is a cylindrical member surrounding the axis O.

The holder member 54 is an annular member, and attached to the wrist body 52 so as to be substantially concentric with the wrist body 52. Specifically, the holder member 54 includes a holder 66 and a cover 68 integrally formed with the holder 66. The holder 66 includes a ring portion 70, a cylindrical portion 72 extending axially upward from the ring portion 70, and a fastened portion 74 extending radially outward from the axial lower end part of the ring portion 70.

The ring portion 70 is fitted into the side wall 64 such that an outer peripheral surface 70a of the ring portion 70 contacts an inner peripheral surface 64a of the side wall 64. The outer peripheral surface 70a of the ring portion 70 is formed with an annular groove 70b recessed inward from the outer peripheral surface 70a, and an O-ring 86 for fluid-tightly sealing the outer peripheral surface 70a and the inner peripheral surface 64a is accommodated in the annular groove 70b.

Bearings 76 and 78 are interposed between the cylindrical portion 72 and the wrist flange 56 so as to align in the axial direction. In the present embodiment, the bearing 78 on the axial lower side contacts an axially upper end surface 70c of the ring portion 70. By the bearings 76 and 78, the wrist flange 56 is supported by the holder 66 so as to be rotatable about the axis O.

An end effector (not illustrated) is attached to the lower end of the wrist flange 56. The end effector is e.g. a robot hand including fingers capable of grasping an object or a suction portion capable of attracting an object. Note that the end effector may be any device that carries out a predetermined work on an object, such as a paint applicator or a welding torch.

The fastened portion 74 is formed with a plurality of through holes 74a passing through the fastened portion 74 in the axial direction, while the side wall 64 of the wrist body 52 is formed with a plurality of fastening holes 64b (tap holes, etc.) at positions corresponding to the plurality of through holes 74a. As illustrated in FIG. 2, a plurality of fasteners (e.g., bolts) 80 pass through the through holes 74a so as to be fastened to the fastening holes 64b, respectively, in a state where the holder 66 is fitted into the holder supporting portion 60 such that the fastened portion 74 contacts the side wall 64. In this way, the holder member 54 is fixed to the wrist body 52 by the fastener 80.

The cover 68 is formed integrally with the ring portion 70 so as to project radially inward from the inner peripheral surface 70d of the ring portion 70 of the holder 66. It should be noted that the term "formed integrally with" in the present disclosure means that one member and the other member are coupled to each other in such a manner that they cannot be separated from each other, and form one integral member. The cover 68 is provided so as to cover the oil seal 57 from the outside between the holder 66 (specifically, the ring portion 70) and the wrist flange 56.

The cover 68 is an annular flat plate member, and includes an inner peripheral surface 68a facing the wrist flange 56 and an axially upper end surface 68b facing the oil seal 57. The upper end surface 68b and the inner peripheral surface 70d of the ring portion 70 define an oil seal storage 82 for accommodating the oil seal 57. The inner peripheral surface 68a of the cover 68 is slightly spaced radially outward from the outer peripheral surface 56a of the wrist flange 56.

When the holder member 54 is attached to the wrist body 52, an oil storage 84 is defined between the holder supporting portion 60 and the holder 66 (specifically, the ring portion 70 and the cylindrical portion 72). The oil storage 84 is filled with oil for lubricating the wrist flange 56 and the bearings 76 and 78.

The oil seal 57 prevents the oil filled in the oil storage 84 from leaking out of the wrist structure 50. The oil seal 57 is an annular and fitted over the outer peripheral surface 56a of the wrist flange 56 so as to surround the outer peripheral surface, wherein the inner edge of the oil seal 57 is in contact with the outer peripheral surface 56a so as to be slidable relative to the outer peripheral surface 56a. In the present embodiment, the oil seal 57 is disposed in the oil seal storage 82 so as to contact the upper end surface 68b of the cover 68.

Next, a method of producing the wrist structure 50 will be described. First, the manufacturer prepares the holder member 54. For example, the manufacturer manufactures a one-piece holder member 54 by cutting a one-piece member (e.g., a metal member) or by die cast molding. Alternatively, the manufacturer may first manufacture a part corresponding to the holder 66 of the holder member 54 by cutting or molding, and subsequently, manufacture the holder member 54 by fixing a part corresponding to the cover 68 integrally to the holder 66 by e.g. welding.

Next, the manufacturer inserts the oil seal 57 into the oil seal storage 82 so as to contact the upper end surface 68b of the cover 68 from the tip-end side (i.e., the upper side in FIG. 2) of the cylindrical portion 72. Next, the manufacturer fits the bearings 76 and 78 over the outer peripheral surface 56a of the wrist flange 56, and then, inserts the wrist flange 56 with the bearings 76 and 78 into the holder member 54 from the tip-end side of the cylindrical portion 72. As a result, the bearing 78 contacts the end surface 70c of the ring portion 70, and the wrist flange 56 is fitted into the oil seal 57.

Alternatively, the manufacturer may first sequentially install the bearings 78 and 76 in the cylindrical portion 72, and subsequently, insert the wrist flange 56 into the bearings 76 and 78 and the oil seal 57 which have been installed in the holder member 54. Next, the manufacturer fits the holder 66 into the holder supporting portion 60 such that the fastened portion 74 contacts the side wall 64, and fixes the fastened portion 74 to the side wall 64 by the fastener 80. Next, the manufacturer fills the oil storage 84 with lubricating oil through an oil injection hole (not illustrated) formed in the holder supporting portion 60 so as to be in fluid communication with the oil storage 84. In this way, the wrist structure 50 is produced.

As described above, in the present embodiment, the cover 68 for covering the oil seal 57 from the outside is provided. According to this configuration, when the wrist structure 50 is cleaned with a high-pressure jet, the high-pressure jet can be prevented from directly impinging on the oil seal 57, thereby preventing the oil seal 57 from being displaced by the high-pressure jet, or preventing the high-pressure jet from entering inside of the wrist structure 50. It is also possible to prevent external foreign matter (dust, cutting fluid, etc.) from adhering to the oil seal 57.

Further, according to the present embodiment, since the cover 68 is formed integrally with the holder 66, the strength of the cover 68 can be increased as compared with a case where the cover 68 is formed of a member separate from the holder 66. Therefore, the cover 68 can be prevented from being deformed by the high-pressure jet or the like. Further, since the holder member 54 can be formed of a single member, the number of parts for the wrist structure 50 can be reduced.

Next, a wrist structure 100 according to another embodiment will be described with reference to FIGS. 3 and 4. The wrist structure 100 differs from the above-described wrist structure 50 in the structure of a holder member 102. Specifically, the holder member 102 is an annular member centered about the axis O, and includes a holder 104 and a cover 105.

The holder 104 includes a ring portion 106, a cylindrical portion 108 extending axially upward from an axial upper end surface 106a of the ring portion 106, and the fastened portion 74 extending radially outward from the axial lower end part of the ring portion 106. The ring portion 106 includes the annular upper end surface 106a and a cylindrical inner peripheral surface 106b extending downward from the radially inner edge of the upper end surface 106a. The upper end surface 106a and the inner peripheral surface 106b orthogonally intersect with each other. In addition, the radius of the inner peripheral surface 106b is smaller than that of the inner peripheral surface 108a of the cylindrical portion 108.

In the present embodiment, one bearing 110 is interposed between the cylindrical portion 108 and the wrist flange 56. Specifically, the upper end surface 106a of the ring portion 106 and the inner peripheral surface 108a of the cylindrical portion 108, that are substantially perpendicular to each other, define a bearing storage 112 for accommodating the bearing 110. The bearing 110 accommodated in the bearing storage 112 contacts the upper end surface 106a and the inner peripheral surface 108a.

The outer peripheral surface 108b of the cylindrical portion 108 is formed with an annular groove 108c recessed inwardly from the outer peripheral surface 108b, wherein an O-ring 86 is accommodated in the annular groove 108c. The O-ring 86 fluid-tightly seals the outer peripheral surface 108b of the cylindrical portion 108 and the inner peripheral surface 64a of the side wall 64 of the wrist body 52.

The cover 105 is formed integrally with the ring portion 106 so as to project radially inward from the inner peripheral surface 106b of the ring portion 106. The cover 105 is provided between the holder 104 (more specifically, the ring portion 106) and the wrist flange 56 so as to cover the oil seal 57 from the outside.

The cover 105 is an annular flat plate member, and includes an inner peripheral surface 105a facing the wrist flange 56, an axially upper end surface 105b facing the oil seal 57, an axially lower end surface 105c opposite the upper end surface 105b, and an annular recess 105d formed in the upper end surface 105b. The upper end surface 105b of the cover 105 and the inner peripheral surface 106b of the ring portion 106 define the oil seal storage 82 for accommodating the oil seal 57. The inner peripheral surface 105a of the cover 105 is slightly spaced radially outward from the outer peripheral surface 56a of the wrist flange 56.

The recess 105d is provided so as to be recessed downward from the upper end surface 105b of the cover 105, and extends in the circumferential direction. Due to the recess 105d, a gap is formed between the upper end surface 105b of the cover 105 and the oil seal 57, whereby preventing the lip portion 57a of the oil seal 57 from interfering with the cover 105.

In the present embodiment, the cover 105 is provided integrally with the holder 104 so as to project downward from an axial lower end surface 114 of the holder 104. The end surface 114 of the holder 104 is a flat surface defined by the axially lower end surfaces of the ring portion 106 and the fastened portion 74, and substantially orthogonal to the axis O.

Thus, the cover 105 is disposed at a position projecting axially downward with respect to the fastened portion 74 of the holder 104. Due to this arrangement, the lower end surface 105c of the cover 105 is disposed at a position in the axial direction the same as the lower end surface of the head 80a of the fastener 80 fastened to the fastened portion 74, or at a position slightly displaced downward from the lower end surface of the head 80a.

By arranging the cover 105 so as to project downward with respect to the fastened portion 74 in this manner, the dimension of the bearing storage 112 can be set larger, and the bearing 110 having a larger diameter can be used for the wrist structure 100. According to this configuration, it is possible to more-stably support the rotation of the wrist flange 56, and enhance the rigidity of the assembly of the wrist flange 56 and the holder member 102.

Figure 4:
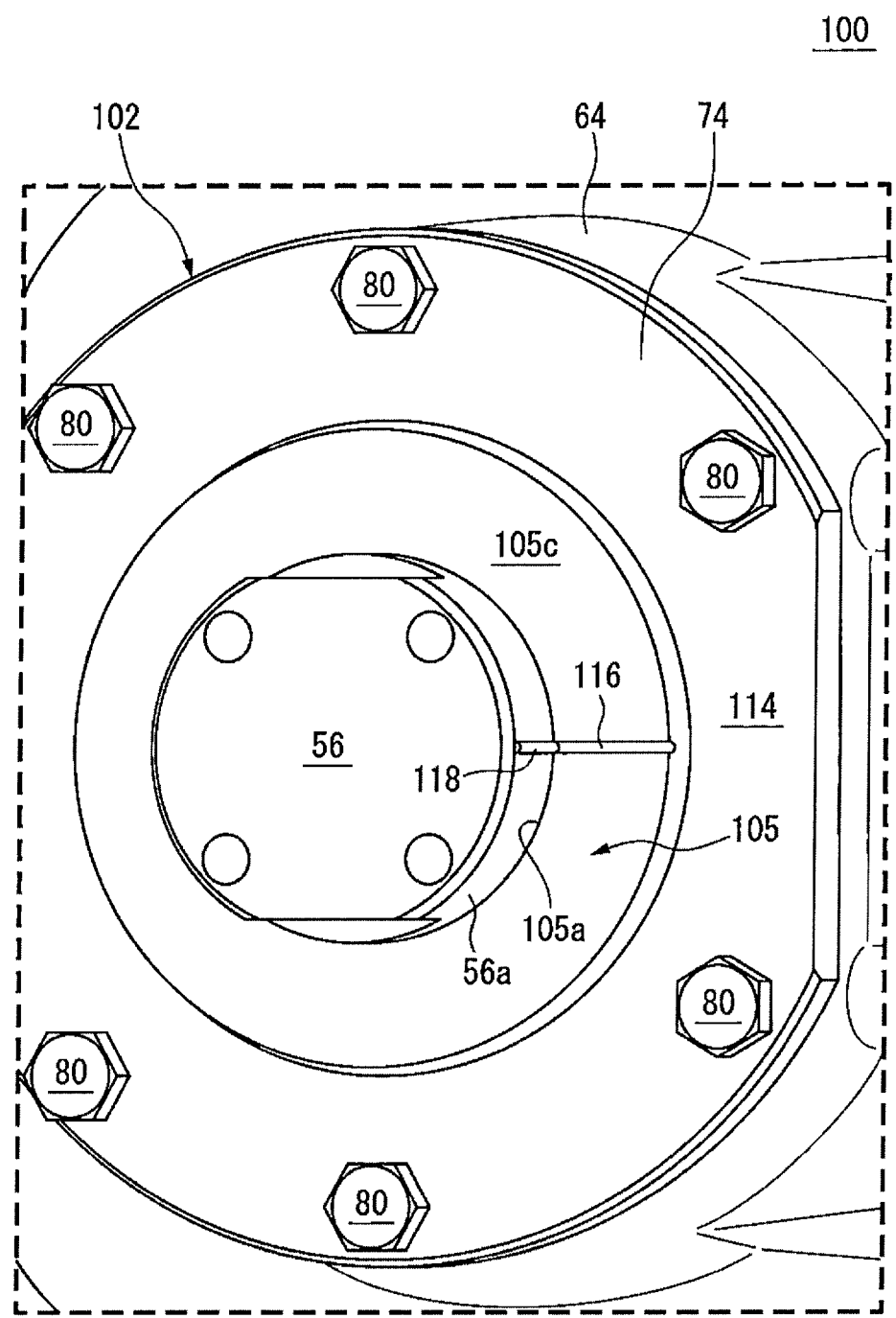
FIG. 4 is a view of the wrist structure illustrated in FIG. 3 as viewed from an arrow A in FIG. 3.

As illustrated in FIG. 4, an index 116 indicative of a rotational reference position of the wrist flange 56 is formed on the lower end surface (outer surface) 105c of the cover 105. In the present embodiment, the index 116 is a so-called marking-off line, and formed integrally with the lower end surface 105c as a straight line visible to the operator. The index 116 may be comprised of e.g. a concave or convex portion formed on the lower end surface 105c, or may be a coating or seal provided on the lower end surface 105c.

On the other hand, an index 118 is formed on the outer peripheral surface 56a of the wrist flange 56. The index 118 is a straight line provided at a position alignable with the index 116. When the index 116 and the index 118 are aligned to form a straight line, the wrist flange 56 is positioned at the rotational reference position (e.g., the position where the rotation angle of the end effector around the axis O is considered to be 0°) with respect to the holder member 102 and the wrist body 52.

Next, a method of producing the wrist structure 100 will be described. First, the manufacturer provides the holder member 102. For example, the manufacturer manufactures the holder member 102 by cutting a one-piece member (a metal member) or by die cast. Alternatively, the manufacturer may first manufacture a part corresponding to the holder 104 of the holder member 102 by e.g. cutting or molding, and subsequently, fix a part corresponding to the cover 105 to the holder member 102 by e.g. welding, in order to manufacture the holder member 102.

Next, the manufacturer inserts the oil seal 57 into the oil seal storage 82 from the tip-end side of the cylindrical portion 108 so as to contact the upper end surface 105b of the cover 105. Next, the manufacturer fits the bearing 110 over the outer peripheral surface 56a of the wrist flange 56, and then inserts the wrist flange 56 with the bearing 110 into the holder member 102 from the tip-end side of the cylindrical portion 108. As a result, the bearing 110 contacts the upper end surface 106a of the ring portion 106 and is accommodated in the bearing storage 112, while the wrist flange 56 is fitted into the oil seal 57.

Alternatively, the manufacturer may first install the bearing 110 in the bearing storage 112, and subsequently, insert the wrist flange 56 into the bearing 110 and the oil seal 57 which have been installed in the holder member 54. Next, the manufacturer fits the holder 104 into the holder supporting portion 60 such that the fastened portion 74 contacts the side wall 64, and then fixes the fastened portion 74 to the side wall 64 by the fastener 80. Next, the manufacturer fills the oil storage 84 with lubricating oil through the oil injection hole (not illustrated). In this way, the wrist structure 100 is produced.

In the present embodiment, the cover 105 for covering the oil seal 57 from the outside is provided. According to this configuration, similar to the above-described embodiment, the high-pressure jet can be prevented from impinging on the oil seal 57 directly, thereby preventing the oil seal 57 from being displaced by the high-pressure jet, or preventing the high-pressure jet from entering the wrist structure 50. It is also possible to prevent external foreign matter (dust, cutting fluid, etc.) from adhering to the oil seal 57. Further, the strength of the cover 105 can be increased and the number of parts can be reduced.

In the above-described embodiments, the holder member 54 or 102 is fixed to the wrist body 52 by the fastener 80. However, the holder member 54 or 102 may be configured to be fixed to the wrist body 52 without the fastener 80. Such an embodiment will be described below with reference to FIG. 5.

Figure 5:
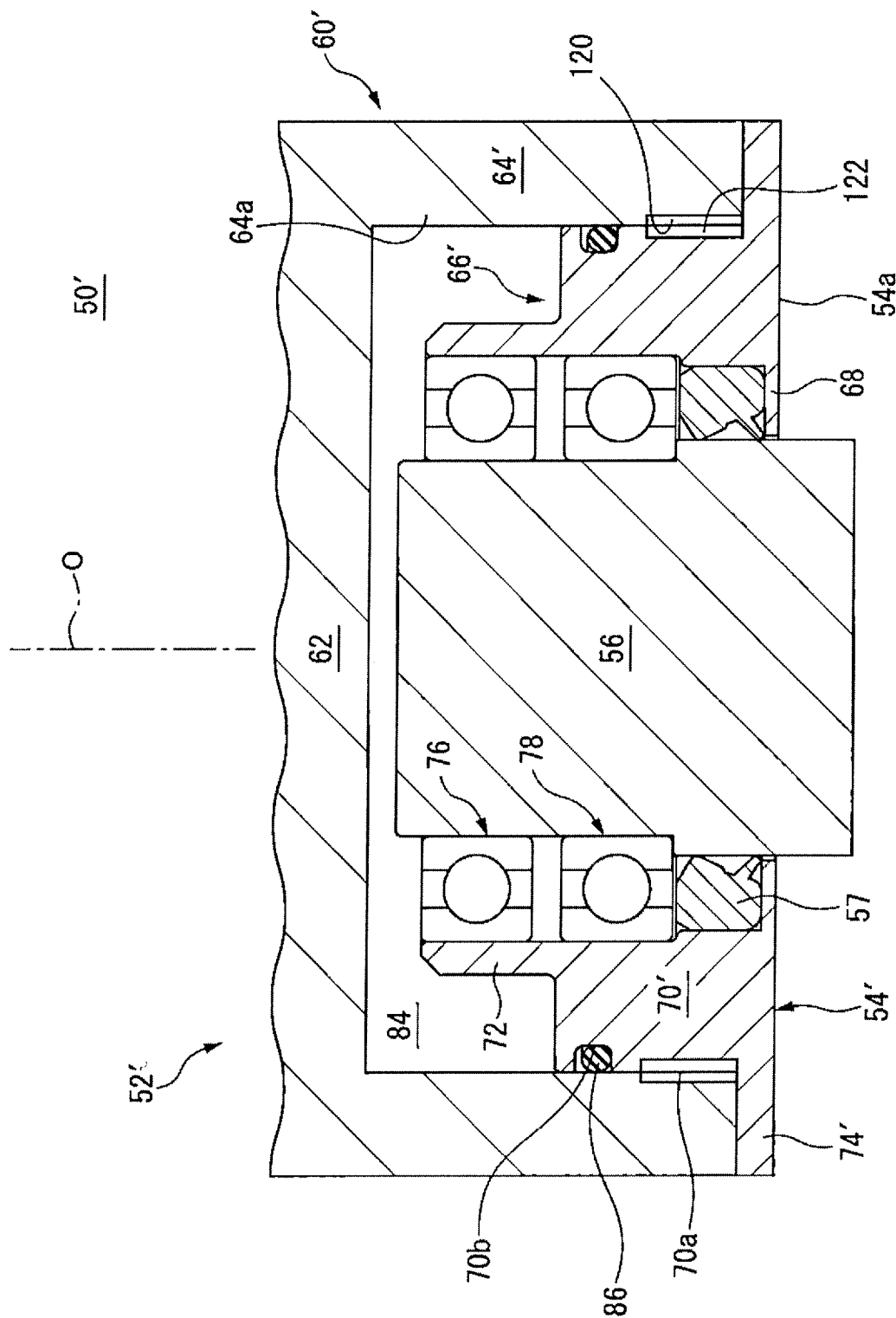
FIG. 5 is an enlarged cross-sectional view of a main portion of a wrist structure according to still another embodiment.

The wrist structure 50' illustrated in FIG. 5 includes a wrist body 52', a holder member 54', the wrist flange 56, and the oil seal 57. The wrist body 52' includes the base 58 (FIG. 1) and a holder supporting portion 60', wherein the holder supporting portion 60' includes the base portion 62 and a side wall 64'. In the present embodiment, a first threaded portion (first engaging portion) 120 is formed on the inner peripheral surface 64a of the side wall 64'.

On the other hand, the holder member 54' includes a holder 66' and the cover 68 formed integrally with the holder 66', wherein the holder 66' includes a ring portion 70', the cylindrical portion 72, and a flange portion 74'. In the present embodiment, a second threaded portion (second engaging portion) 122 is formed on the outer peripheral surface 70a of the ring portion 70'.

The first threaded portion 120 and the second threaded portion 122 engage (specifically, screw-engage) with each other. Additionally, in the present embodiment, the threaded portions 120 and 122 are provided axially lower side of the annular groove 70b (i.e., O-ring 86). Further, a sealing material may be provided on the threaded portions 120 and 122 to fluid-tightly seal between the threaded portions 120 and 122 when the threaded portions 120 and 122 are engaged. The flange portion 74' has the same outer shape as the fastened portion 74 described above, but is not formed with the above-mentioned through hole 74a.

When the holder member 54' is fixed to the wrist body 52' in the wrist structure 50', the holder member 54' is rotated and inserted into the wrist body 52' such that the second threaded portion 122 formed on the ring portion 70' is screwed into the first threaded portion 120 formed on the side wall 64'. Due to this, the holder member 54' can be fixed to the wrist body 52' without the above-described fastener 80.

According to the present embodiment, since the fastener 80 can be omitted, the lower end surface 54a of the holder member 54' can be formed into a flat shape without concave-convex portions. Thus, if the wrist structure 50' is applied to e.g. a food handling robot, the propagation of bacteria can be suppressed when compared with the case where the lower end surface 54a of the wrist structure 50' includes concave-convex portions, which is advantageous in hygiene.

Figure 3:
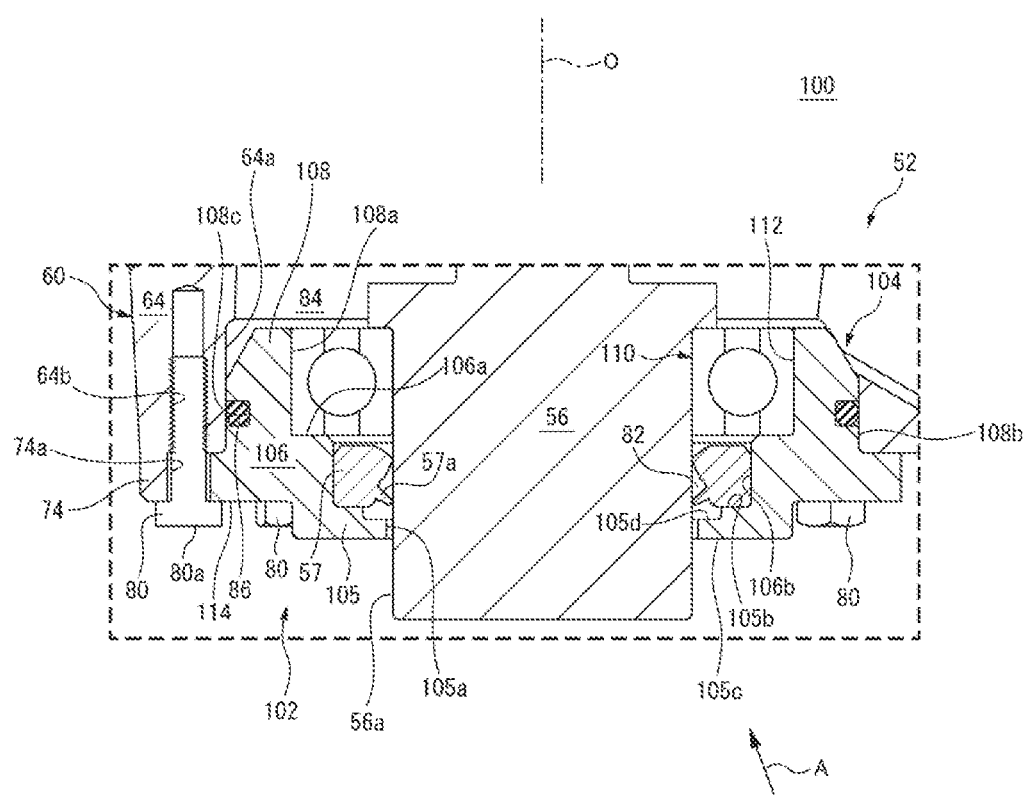
FIG. 3 is an enlarged cross-sectional view of a main portion of a wrist structure according to another embodiment.
Figure 6:
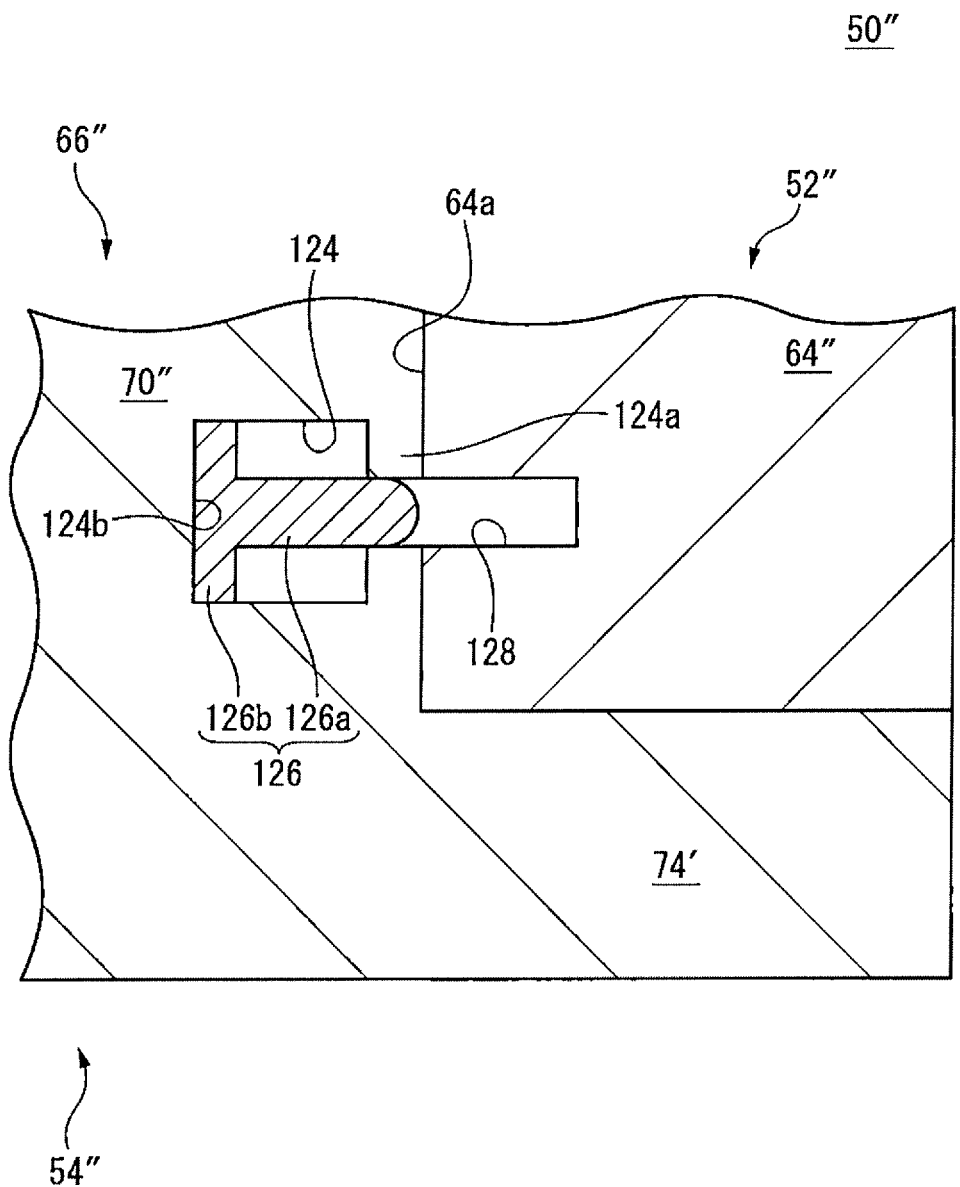
FIG. 6 is an enlarged cross-sectional view of a main portion of a wrist structure according to still another embodiment, illustrating a state in which a pin is disposed in a retracted position.
Figure 7:
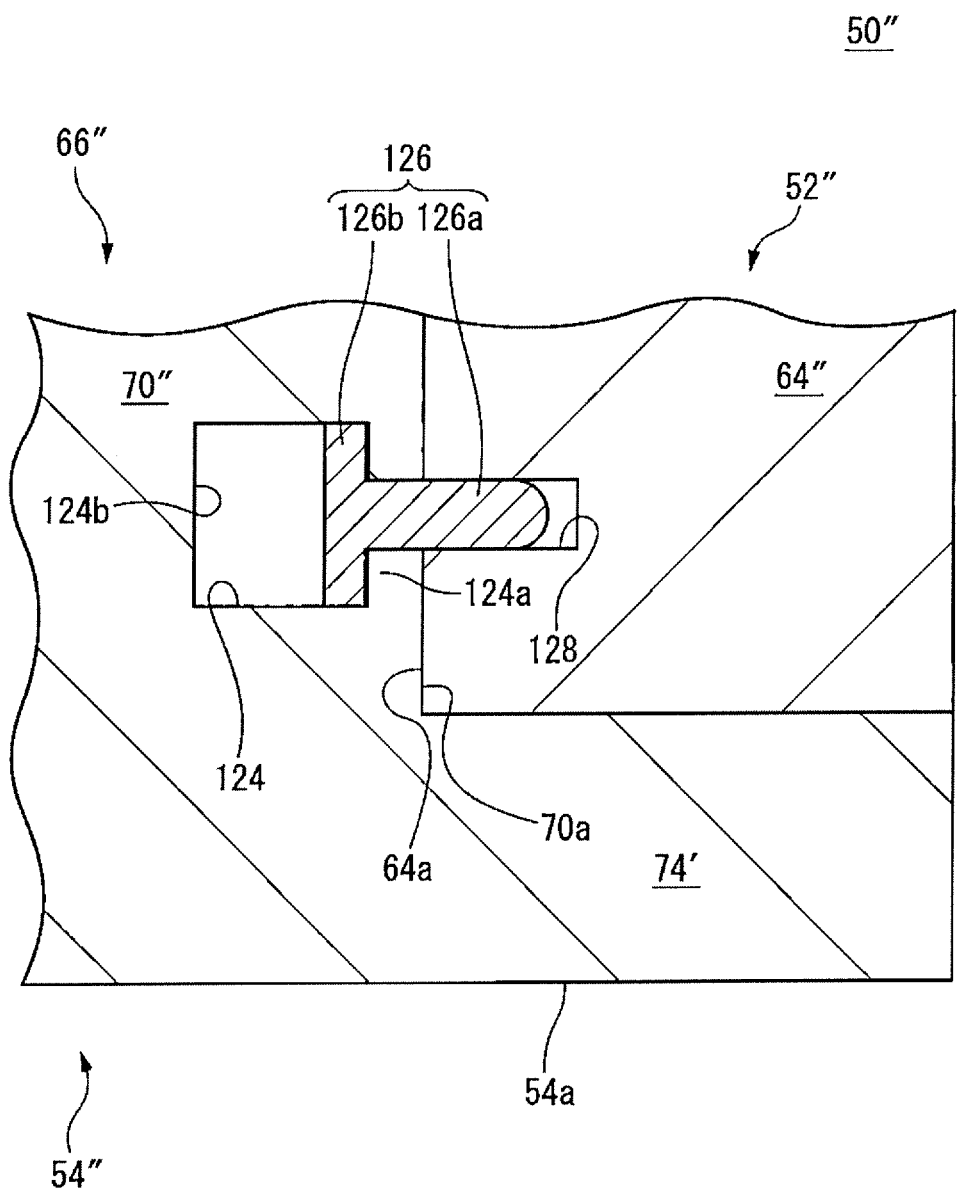
FIG. 7 illustrates a state in which the pin illustrated in FIG. 6 is disposed in an advanced position.

Note that the first threaded portion 120 and the second threaded portion 122 can be applied to the wrist structure 100 illustrated in FIG. 3. In this case, the second threaded portion 122 may be formed on the outer peripheral surface 108b of the cylindrical portion 108 (or on the outer peripheral surface of the ring portion 106). Further, there is another structure for fixing the holder member 54 or 102 to the wrist body 52 without using the fastener 80, other than the fixing structure such as the threaded portions 120 and 122. FIGS. 6 and 7 illustrate another example of a structure for fixing the holder member 54 or 102 to the wrist body 52.

In the wrist structure 50" illustrated in FIG. 6, a holder 66" of a holder member 54" includes a pin accommodating portion 124 formed so as to be recessed inward from the outer peripheral surface of the ring portion 70", and a pin 126 (second engaging portion) accommodated in the pin accommodating portion 124 so as to advance and retract in the radial direction. A collar 124a, in which the diameter of the pin accommodating portion 124 is reduced, is formed at the opening of the pin accommodating portion 124. The pin 126 includes a shaft portion 126a and a flange portion 126b projecting out from the proximal end of the shaft portion 126a.

On the other hand, the inner peripheral surface 64a of the side wall 64" of the wrist body 52" is formed with a pin receiving hole (first engaging portion) 128 recessed inward from the inner peripheral surface 64a. As illustrated in FIG. 6, when the holder member 54" is inserted into the wrist body 52" such that the flange portion 74' contacts the side wall 64", the pin accommodating portion 124 and the pin receiving hole 128 are aligned in the radial direction so as to be in communication with each other.

FIG. 6 illustrates a state in which the pin 126 is disposed at a retracted position. When the pin 126 is disposed at the retracted position, the flange portion 126b contacts (or is adjacent to) a bottom surface 124b of the pin accommodating portion 124, and the entirety of the pin 126 is accommodated in the ring portion 70". In this state, the holder member 54" can be inserted into and removed out from the wrist body 52".

On the other hand, FIG. 7 illustrates a state in which the pin 126 is disposed at an advanced position. When the pin 126 is disposed at the advanced position, the flange portion 126b contacts the collar 124a, and the shaft portion 126a of the pin 126 projects radially outward from the outer peripheral surface 70a of the ring portion 70" and is received in the pin receiving hole 128 so as to engage the pin receiving hole 128. As a result, the holder member 54" is immovably fixed to the wrist body 52".

The pin 126 may be automatically advanced and retracted between the retracted position and the advanced position by a servomotor or a hydraulic or pneumatic cylinder, for example. In this case, the servomotor or the cylinder may be built in the holder 66" (e.g., the ring portion 70"). Alternatively, the pin 126 may be manually advanced and retracted by an operator via a manual advancement and retraction structure.

Further, a plurality of pin accommodating portions 124 and pins 126 may be provided in the holder 66" so as to align in the circumferential direction at substantially equal intervals, while a plurality of pin receiving holes 128 may be provided in the side wall 64" at the same intervals as the pin accommodating portions 124 and the pins 126. In this case, the holder member 54" can be more-stably fixed to the wrist body 52".

According to the present embodiment, since the fastener 80 can be omitted, the lower end surface 54a of the holder member 54" can be formed into a flat shape without convex-concave portions. accordingly, if the wrist structure 50" is applied to a food handling robot, it is possible to suppress the propagation of bacteria, which is advantageous in hygiene. The pin accommodating portion 124 and the pin 126 can be applied to the wrist structure 100 illustrated in FIG. 3. In this case, the pin accommodating portion 124 and the pin 126 may be provided in the ring portion 106 or the cylindrical portion 108.

Figure 8:
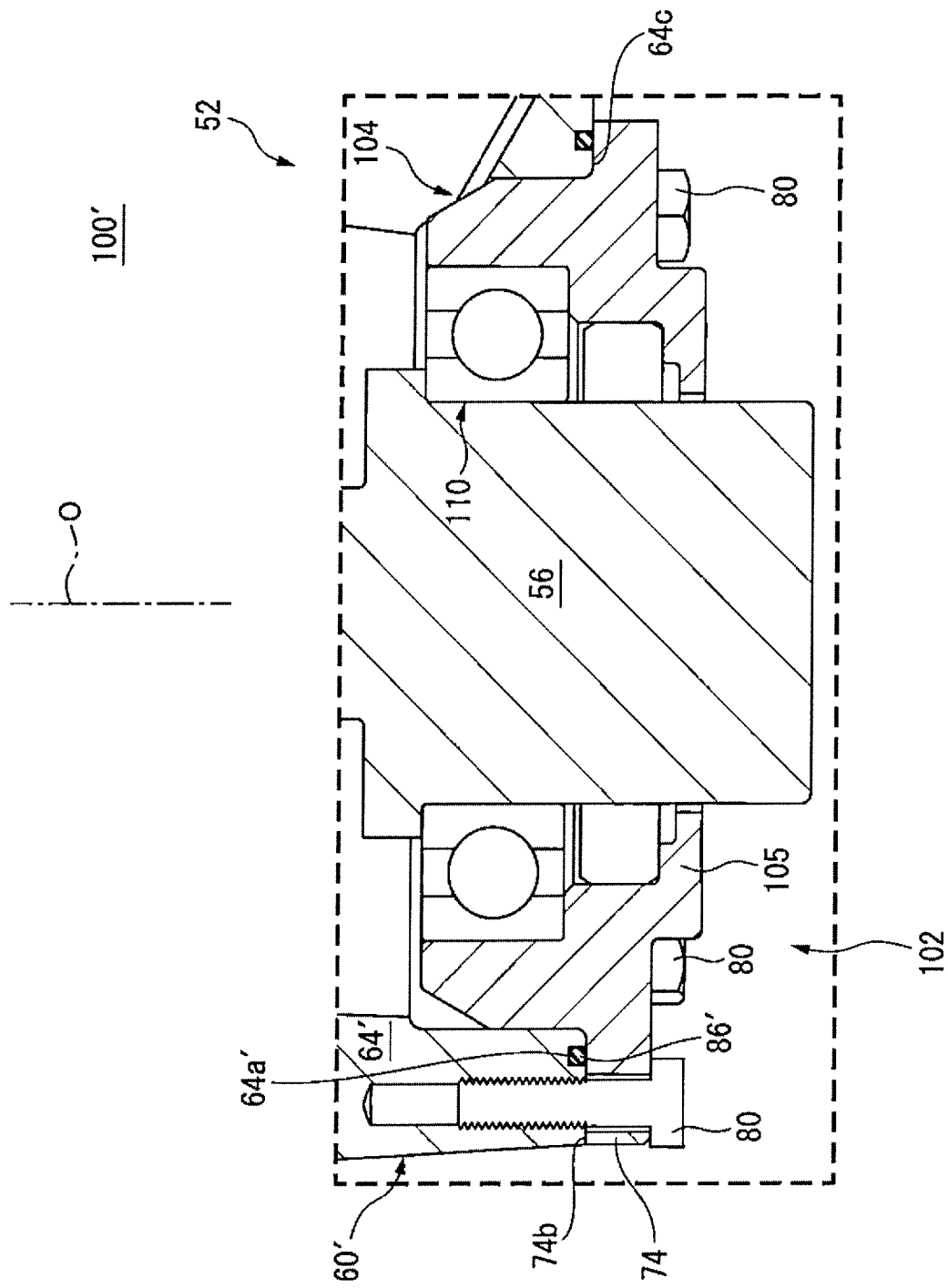
FIG. 8 is an enlarged cross-sectional view of a main portion of a wrist structure according to still another embodiment.

Note that the installation position of the O-ring 86 is not limited to that in FIG. 2 or 3. For example, in a wrist structure 100' illustrated in FIG. 8, an axially lower end surface 64c of the side wall 64' of the holder supporting portion 60' is formed with a recess 64a' recessed inward from the end surface 64c, wherein the O-ring 86' is accommodated in the recess 64a'. The O-ring 86' fluid-tightly seals the end surface 64c of the side wall 64' and an axially upper end surface 74b of the fastened portion 74 of the holder 104. Alternatively, a recess may be formed at the end surface 74b of the fastened portion 74 to receive the O-ring 86' therein.

Note that, in order to improve sealing performance between the side walls 64, 64', 64" of the holder supporting portions 60, 60' and the holders 66, 66', 66", 104, a sealing material may be provided at the contact portion between the side wall 64, 64', 64" and the holder 66, 66", 66", 104. For example, the sealing material may be provided at the contact portion between the axially lower end surface of the side wall 64, 64', 64" and the axially upper end surface of the fastened portion 74 (or flange portion 74') of the holder 66, 66', 66", 104.

In the embodiments described above, the robot 10 is a parallel link robot. However, the wrist structures 50, 50', 50" and 100 in the present disclosure may be applied to any type of robot, such as a vertical articulated robot, that includes a wrist structure. Depending on the type of robot, the shape of each component of the wrist structures 50, 50', 50", and 100 can be appropriately modified.

Although the present disclosure has been described above through the embodiments, the embodiments described above are not intended to limit the claimed invention.

The invention claimed is:

1. A wrist structure of a robot, comprising:
    a wrist body;
    a holder member attached to the wrist body, the holder member including:
        a ring portion having a first inner peripheral surface which defines an oil seal storage;
        a cylindrical portion extending from the ring portion in a first axial direction, the cylindrical portion having a second inner peripheral surface which defines a bearing storage; and
        a cover formed integrally with the ring portion so as to project radially inward from the ring portion, the cover having a first end surface in the first axial direction, which defines the oil seal storage together with the first inner peripheral surface;
    a wrist flange rotatably supported radially inside of the holder member;
    an oil storage provided between the wrist body and the holder member;
    an oil seal disposed in the oil seal storage to prevent oil leakage from the oil storage, the oil seal being insertable into the oil seal storage from the first axial direction-side of the cylindrical portion; and
    a bearing disposed in the bearing storage to rotatably support the wrist flange, the second inner peripheral surface extending from the ring portion to an end of the bearing in the first axial direction so as to surround the bearing over it entire axial length, the bearing being insertable into the bearing storage from an open end in the first axial direction of the second inner peripheral surface,
    wherein the cover is configured to cover the oil seal from the outside between the ring portion and the wrist flange.

2. The wrist structure of the robot of claim 1, wherein the oil seal includes a lip portion projecting radially inward so as to contact the wrist flange, and wherein the cover includes a recess at the first end surface facing the oil seal, the recess forming a gap between the first end surface and the oil seal for preventing interference between the lip portion and the cover.

3. The wrist structure of the robot of claim 1, wherein the wrist body includes a first engaging portion,
    wherein the holder member includes a second engaging portion configured to engage the first engaging portion so as to fix the holder member to the wrist body.

4. The wrist structure of the robot of claim 3, wherein the first engaging portion and the second engaging portion are screws.

5. The wrist structure of the robot of claim 1, wherein an index for indicating a rotational reference position of the wrist flange is formed on an outer surface of the cover.

6. A robot comprising the wrist structure of claim 1.

7. The wrist structure of the robot of claim 1, wherein the ring portion further has a second end surface in the first axial direction, and which extends between the first inner peripheral surface and the second inner peripheral so as to define the bearing storage together with the second inner peripheral surface, and
    wherein the bearing is disposed in the bearing storage by contacting the second end surface.

8. The wrist structure of the robot of claim 1, wherein the holder member further includes and extension portion extending radially outward from the ring portion, and
    wherein an end surface of the ring portion in a second axial direction opposite the first axial direction and an end surface of the extension portion in the second axial direction define a flat surface orthogonal to the axial direction.

9. The wrist structure of the robot of claim 8, wherein the extension portion functions as a fastened portion fastened to the wrist body with a fastener,
    wherein the cover is disposed at a position projecting in the second axial direction with respect to the extension portion.

10. A method of producing the wrist structure of the robot of claim 1, comprising:
    manufacturing the holder member of one-piece member by cutting or molding;

inserting the oil seal into the oil seal storage from the first axial direction-side of the cylindrical portion to dispose the oil-seal in the oil seal storage;

fitting the bearing over an outer peripheral surface of the wrist flange; and inserting the wrist flange to radially inside of the holder member and the oil seal from the first axial direction-side of the cylindrical portion, thereby inserting the bearing into the bearing storage from the first axial direction-side of the cylindrical portion.

\* \* \* \* \*